Nov. 20, 1934.　　　F. L. WOODDELL　　　1,981,016

TOAST HOLDER

Filed Oct. 19, 1933

INVENTOR
Fred L. Wooddell
BY Thos. F. Scofield
ATTORNEY

Patented Nov. 20, 1934

1,981,016

UNITED STATES PATENT OFFICE 1,981,016

TOAST HOLDER

Fred L. Wooddell, Kansas City, Mo.

Application October 19, 1933, Serial No. 694,279

4 Claims. (Cl. 65—59)

My invention relates to a toast holder and more particularly to a container for preserving toast in a warm state.

In hospitals, hotels, and the like, where food is prepared in a kitchen at some distance from the various places where the food is to be consumed and a number of persons are to be served at substantially the same time, it is practically impossible to serve toast in a warm condition. The time passing between the toasting of the bread and its delivery to the patients, in the case of a hospital, or to the guests in the case of a hotel, insures that the toast will be cold. Cold toast is very unpalatable. It is especially desirable in hospitals that pleasant conditions exist, as it is well known that a pleasant environment and pleasing food are conducive to the restoration of health.

One object of my invention is to provide a container for toasted bread, rolls and the like, which will preserve them in a warm state over a sufficient length of time so that the consumer will receive them ready to be eaten while still warm.

Another object of my invention is to provide a device for preserving toasted bread and the like in a warm state which will prevent the toast from becoming soggy or moist due to absorption of condensate resulting from the moisture of the bread.

Other and further objects of my invention will appear from the following description.

In the accompanying drawing which forms part of the instant specification and is to be read in conjunction therewith and in which like numerals are used to indicate like parts in the various views.

In general, my invention contemplates the provision of a container made out of a material capable of being heated and having sufficient weight so that it will absorb enough heat to maintain the toast in a warm state over an appreciable time interval. Means are provided within the container for spacing the toast from the bottom wall thereof. The container is provided with sufficient vent area to permit the escape of vapors. The exterior bottom surface of the container is provided with means for spacing it from a supporting surface so that the vents in the bottom of the container will not be closed by the surface upon which it rests, as for example, a tray.

Figure 1:
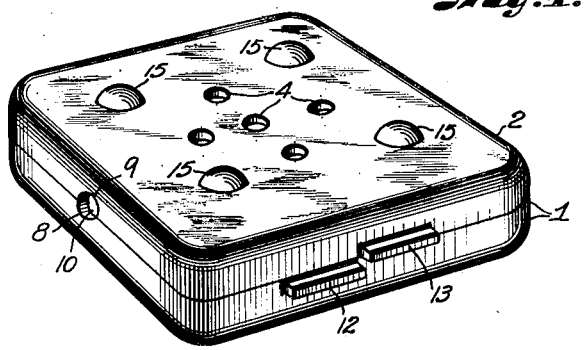
Figure 1 is a perspective view of a container embodying one mode of carrying out my invention.
Figure 2:
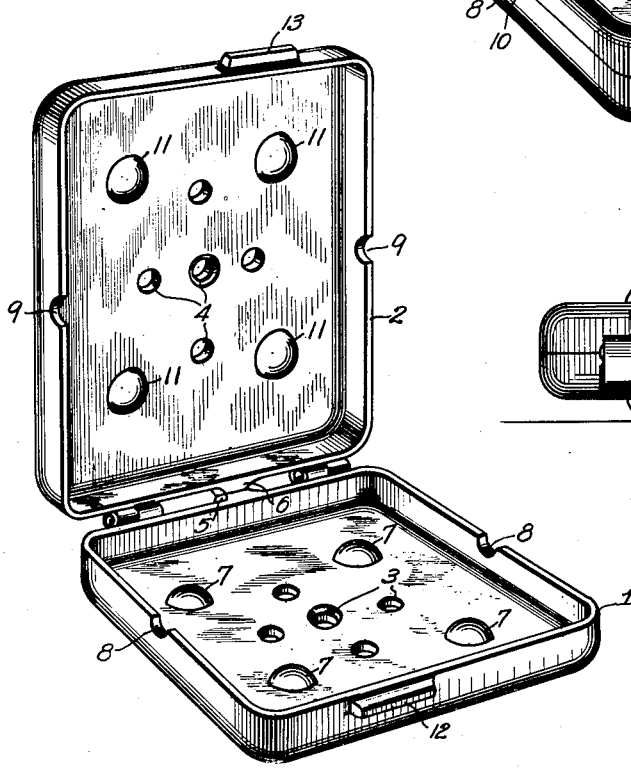
Figure 2 is a perspective view of the container shown in Figure 1 in open condition.
Figure 3:
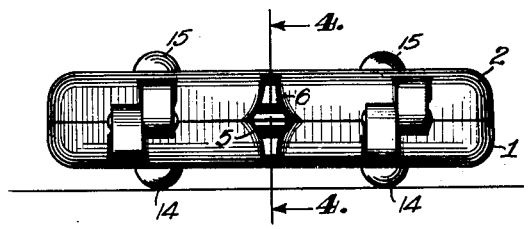
Figure 3 is an end view of the container shown in Figure 1.
Figure 4:
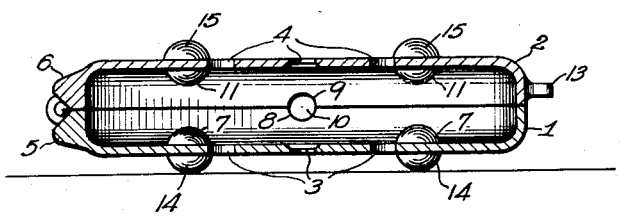
Figure 4 is a sectional view taken on the line 4—4 of Figure 3.

More particularly referring now to the drawing, a container 1 is provided with a hinged cover 2. The container may be made out of aluminum, brass, glass or any other suitable material which is adapted to be heated without injury. For ease of manufacture, container 1 and its cover 2 are identical so that only one casting or forging need be made, any two of the castings or forgings going to make the completed container. It is to be understood, however, that the container may, if desired, be made of any suitable shape or size so that a number of slices of toasted bread may be placed therein. If the container is to be used for keeping rolls in a heated state, it will, of course, have a different shape. The container which is provided with vent openings 3 and a cover member 2 is provided with vent openings 4. Lugs 5 and 6 are provided so that the cover may be supported in raised position as shown in Figure 2. The bottom surface of the container 1 is provided with projections 7. The projections are adapted to support the toast in spaced relation to the bottom wall of the container 1 so that any condensate formed on the bottom surface will not be absorbed by the toast. The vapors given off by the toast, however, are adapted to leave the container by means of the vents 3 and 4. The side walls of the container are provided with notches 8 and the cover member is provided with complementary notches 9. By referring to Figure 1 it will be seen that the notches 8 and 9 are adapted to form side vents 10. The cover member 2 is likewise provided with projections 11 so that, if the container is turned upside down, there will be no danger of the toast resting against the cover member and absorbing condensate or permitting the toast to clog the vent openings 4. Projecting lugs 12 and 13 are provided to enable the cover member to be lifted up to give access to the container. It is to be understood, of course, that any suitable heat insulating material such as bakelite, mica, or the like, may be fitted over lugs 12 and 13 to act as opening handles. The exterior of the container 1 is provided with projecting members 14 as can readily be seen by reference to Figures 3 and 4. These projections may be of any suitable shape and are adapted to support the container in spaced relation to the surface upon which it rests. It will be obvious that vapors may escape from the container from all sides of the toast. If the projections 14 were not present, the bottom vents 3 would be closed by the surface upon which the container rested. The upper cover member is also provided with projections 15 so that the container may be placed end for end or a stack of containers be placed one upon top of the other without the danger of closing the top vents 4.

In operation, the container is heated in any suitable manner such as by placing it in an oven or over heat and the toast placed therein. The cover member is then closed and heat absorbed by the container is gradually liberated, maintaining the toasted bread or the like in a warm condition. Vapors given off are liberated through the vents and the interior area of the device will be maintained in a warm, dry condition.

It is to be understood, of course, that suitable changes may be made by those skilled in the art, without departing from my invention.

Having thus described my invention, what I claim is:

1. A toast holder for preserving toasted bread and the like in warm condition comprising a casing, a cover for said casing, said cover and said casing having sufficient mass to enable the same to hold a substantial quantity of heat, said casing and cover being formed with venting means to provide for circulation of air through said container and means in the interior of the casing for supporting bread in spaced relation from the bottom of said casing.

2. A toast holder for preserving toasted bread and the like in warm condition comprising a casing, a cover for said casing, said cover and said casing having sufficient mass to enable the same to hold a substantial quantity of heat, said casing and cover being formed with venting means to provide for circulation of air through said container and means integral with the interior of the casing for supporting bread in spaced relation from the bottom of said casing.

3. A toast holder for preserving toasted bread and the like in warm condition comprising a casing, a cover hinged to said casing, said cover and said casing having sufficient mass to enable the same to hold a substantial quantity of heat, said casing and cover being formed with venting means to provide for circulation of air through said container and means in the interior of the casing for supporting bread in spaced relation from the bottom of said casing.

4. A container comprising a casing comprising a pair of identical hinged members having vent openings and means on the interior surfaces thereof adapted to support toasted bread or the like in spaced relation to the top and bottom of the container, and means on the exterior surfaces thereof adapted to support the container on a surface in spaced relation thereto.

FRED L. WOODDELL.